Sept. 18, 1962  J. G. VOLLMER, SR  3,054,534
ICE CREAM DISPENSER
Filed Aug. 22, 1960  4 Sheets-Sheet 4

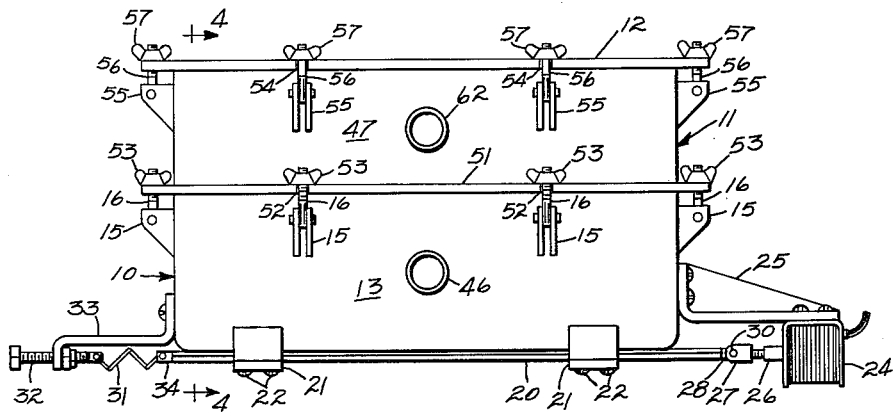
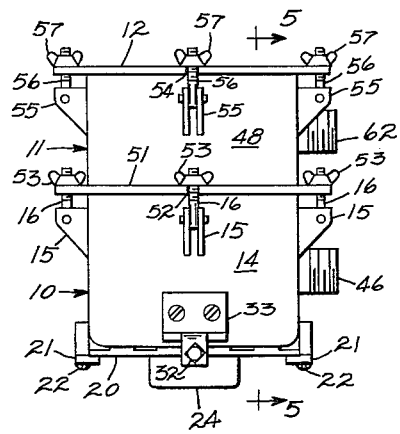
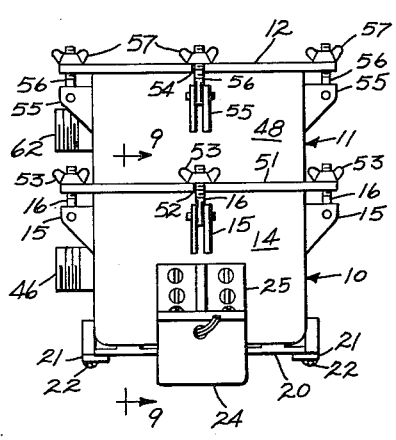
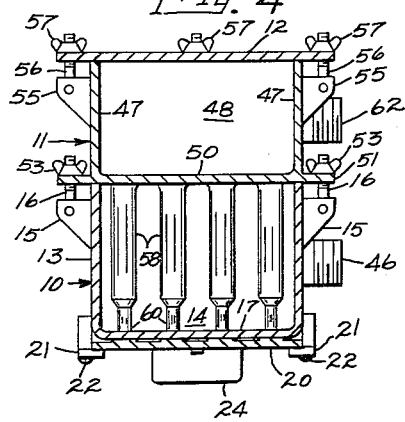

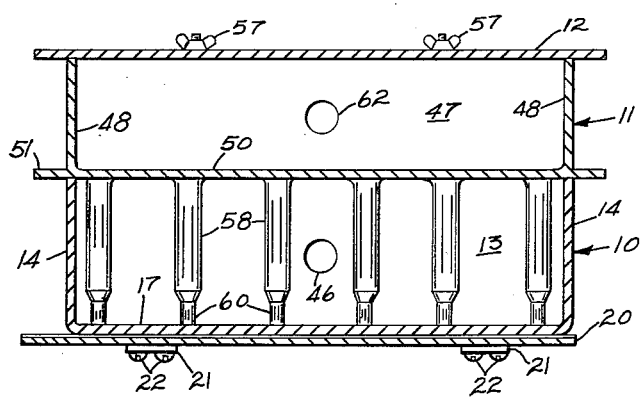
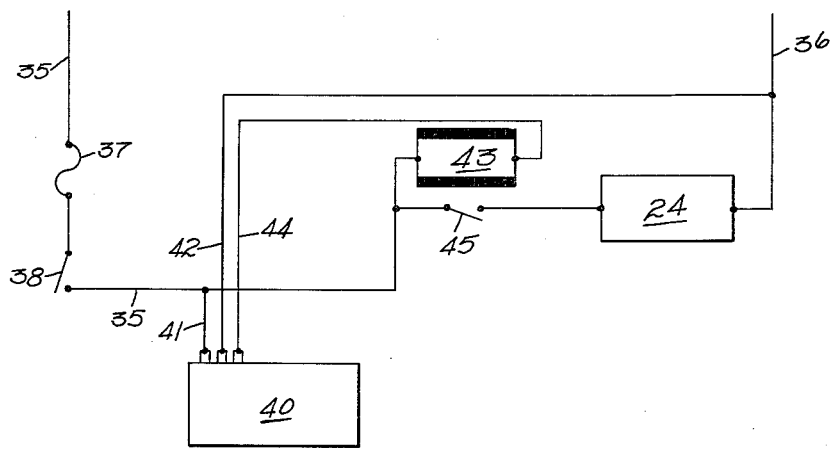

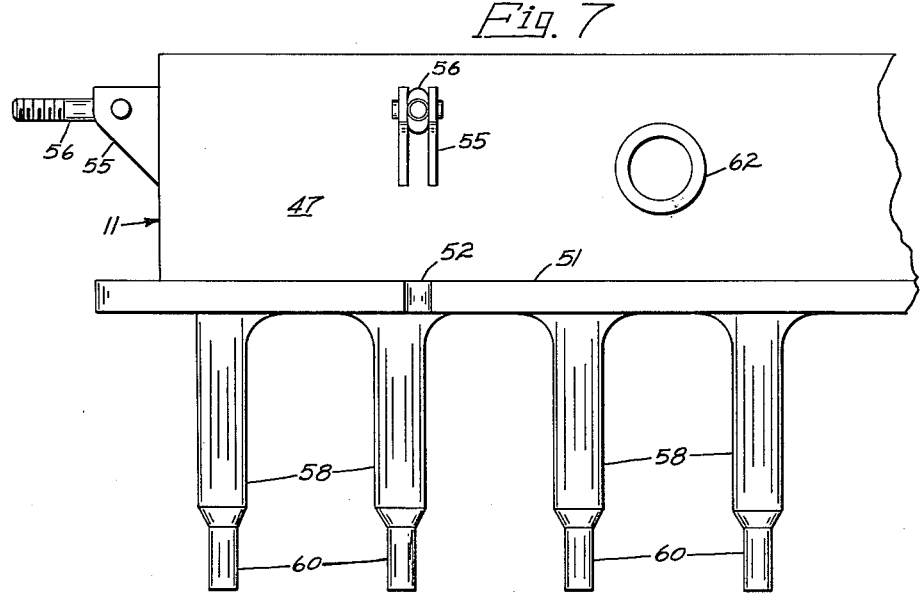
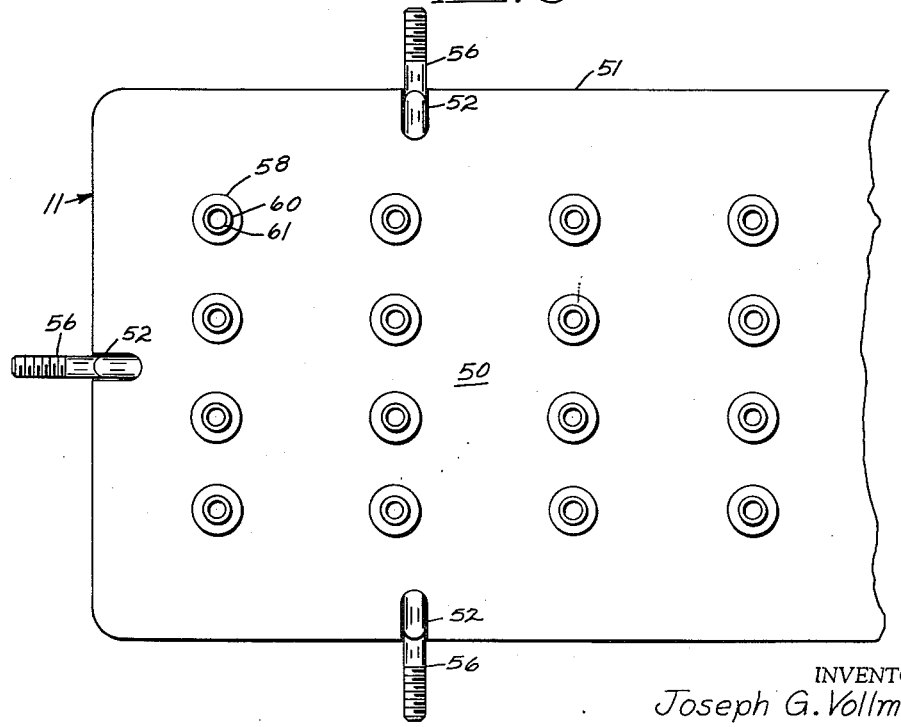

INVENTOR.
Joseph G. Vollmer, Sr.
BY Wells & St. John
Attys.

United States Patent Office 3,054,534
Patented Sept. 18, 1962

3,054,534
ICE CREAM DISPENSER
Joseph G. Vollmer, Sr., 2124 Ellis Ave., Boise, Idaho
Filed Aug. 22, 1960, Ser. No. 50,933
3 Claims. (Cl. 222—70)

This invention relates to a novel machine for dispensing semi-solid state materials, such as ice cream. It is intended primarily for commercial installations where large quantities of the material are packaged in small individual containers. An example is the small cup shaped container used in the sale of ice cream and ice cream sundaes.

It is a first object of this invention to provide a dispenser capable of automatically filling a plurality of containers upon actuation of a main control, the portion amount being pre-set and regulated precisely for constant uniformity in the filled containers.

It is a second object of the invention to provide such a dispenser capable of supplying a syrup or other material simultaneously with the principal material so as to dispense a final article consisting of two different materials that are not mixed together during the dispensing process. The quantity control of the second material is to be controlled simultaneously with the quantity control of the first material.

It is another object to provide a multiple dispenser capable of being easily converted between use for one or two materials without altering or adjusting any parts of the device.

These and further objects will be discovered by a study of the following description and the accompanying drawings which show a preferred form of my invention. This form is merely exemplary and is not intended to limit the scope of the claimed invention.

In the drawings:

FIGURE 1 is a side view of the assembled apparatus for dispensing two materials;

FIGURE 2 is an end view taken from the left in FIGURE 1;

FIGURE 3 is an end view taken from the right in FIGURE 1;

FIGURE 4 is a sectional view taken along line 4—4 in FIGURE 1;

FIGURE 5 is a sectional view taken along line 5—5 in FIGURE 2;

FIGURE 6 is a wiring diagram of the control circuit;

FIGURE 7 is an enlarged side view of a disassembled top tank with the right hand end broken away;

FIGURE 8 is a bottom view looking up at FIGURE 7;

Figure 9:
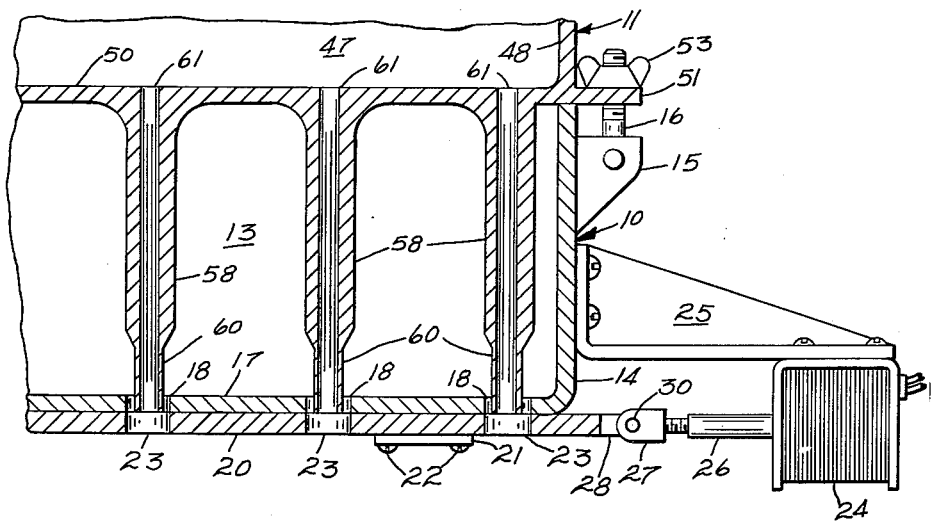
FIGURE 9 is an enlarged sectional view of the apparatus taken along line 9—9 in FIGURE 3 with the top and left hand areas broken away.
Figure 10:
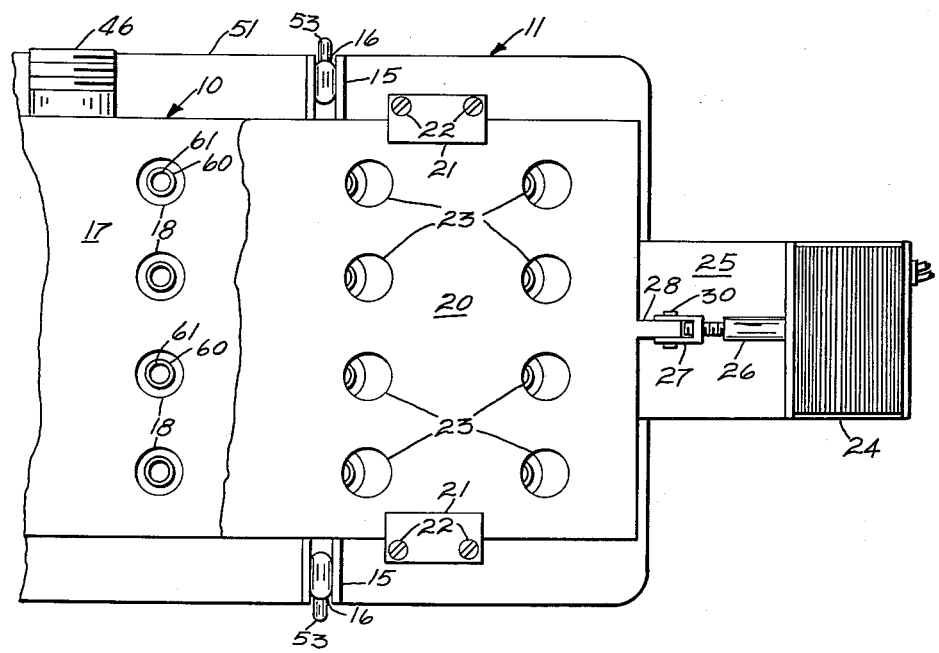
FIGURE 10 is a bottom view looking up at FIGURE 9 with the solenoid partially actuated and a portion of the slidable cover broken away.

This invention is designed primarily for use in commercial ice cream preparation. A popular confection today is the ice cream sundae, comprising a portion of ice cream plus a topping of flavored syrup. Such sundaes can be prepared in advance of sale in a covered container, the two ingredients being inserted in the container without mixing them. According to this invention, an apparatus is designed to fill a plurality of cups simultaneously, inserting both the syrup and semi-frozen ice cream. The same apparatus can also be instantly converted for use when a solid ice cream confection is desired without syrup. Any suitable material may be used as the secondary filling, such as a second flavor of ice cream. The apparatus can be used to insert the materials in any desired forms, although a cup is used herein merely as an example.

The invention is generally shown in FIGURES 1–5. It consists generally of a bottom tank 10, a top link 11 and a cover 12. The bottom tank 10 is generally rectangular in shape, having side walls 13 and end walls 14. The top edges of walls 13 and 14 lie in a single plane and are machined smooth to provide an effective sealing surface. Adjacent to these top edges, a plurality of ears 15 are formed which pivotally mount bolts 16 positioned for motion in a vertical plane.

The plane lower surface 17 of bottom tank 10 is provided with a plurality of circular apertures 18 formed in rows so as to present a uniform pattern. A slidable plate 20 is located adjacent to surface 17 by means of four overlapping bearing plates 21 secured to surface 17 by means of screws 22. Plate 20 is slidable longitudinally along the length of surfaces 17. Plate 20 is also provided with circular apertures 23 having the same shape and pattern as apertures 18. By sliding plate 20 relative to surface 17 the apertures 23 may be aligned with apertures 18 or the apertures 18 may be blocked by the solid portions of plate 20.

A solenoid 24 is used to slide the plate 20 relative to surface 17. Solenoid 24 is attached to a mounting bracket 25 extending outwardly from one end wall 14. The actuating element 26 of solenoid 24 is threadably engaged by a yoke 27 which is pivotally held on an ear 28 of plate 20 by means of a pin 30. Return of plate 20 is accomplished by a tension spring 31 which is adjustably mounted on a bolt 32 engaged with a mounting bracket 33 fixed to the opposite end wall 14. The remaining end of spring 31 is secured to an ear 34 formed on plate 20. The spring 31 is designed to normally hold the plate 20 in position with the apertures 23 and 18 aligned. Solenoid 24 is enabled to block apertures 18 when actuated.

The control circuit is schematically shown in FIGURE 6. The two input lines from the power supply (not shown) are designated as 35 and 36. Line 35 is provided with a fuse 37 and a main control switch 38 and is connected to a timer 40 by a branch wire 41. The timer 40 is a repeating automatic timer having a controllable period. Such timers are a commercial item and will not be further described herein. A branch line 42 is also connected to timer 40 and is wired to line 36.

Timer 40 is wired to a relay 43 by means of a wire 44. The remaining terminal relay 43 is connected to line 35. Timer 40 includes a controlled circuit that is capable of completing a circuit between line 36 and relay 43 to thereby actuate relay 43. The contacts 45 of relay 43 are connected between line 35 and the solenoid 24, which is also connected to line 36.

The timer 40 is pre-set so as to actuate relay 43 and thereby actuate solenoid 24 at stated intervals, to thereby block apertures 18 by movement of plate 20. The exact components utilized in the control circuit are not limiting, since many equivalent electrical or mechanical controls could obviously be substituted in their places.

The bottom tank 10 is provided with a threaded inlet 46 which projects beyond a side wall 13 and opens to the interior of tank 10. Inlet 46 is adapted to be coupled by a suitable coupling device (not shown) to a hose or other suitable delivery assembly which is capable of delivering semi-frozen confections under pressure to the lower tank 10.

The upper tank 11 is also generally rectangular in cross-section and includes a pair of side walls 47, a pair of end walls 48 and a bottom wall. Wall 50 is extended beyond walls 47, 48 in the form of a rectangular plane ledge 51. The ledge 51 is adapted to seat upon the top ends of walls 13, 14 so that walls 13, 47 and 14, 48 respectively are vertically aligned. Ledge 51 is provided with slots 52 cut into its periphery directly above each of the ears 15. Slots 52 receive bolts 16 which can be pivoted to a vertical position and locked in place by wing nuts 53 that bear against the ledge 51. In this manner tanks 10 and 11 are effectively sealed.

Tank 11 is capped by cover 12 which is merely a flat plate having slots 54 cut along its periphery in alignment with slots 52. Ears 55 and pivoted bolts 56 are provided on walls 47, 48 of tank 11 adjacent the plane upper ends of walls 47, 48. Bolts 56 can be swung upward into slots 54 and are secured by using nuts 57 to seal the top end of tank 11.

The bottom wall 50 is formed with a plurality of downwardly extending tubes 58 that have reduced diameter sections 60 at their lower ends which extend within the apertures 18 and terminate flush with the lower surface 17. Each tube 58 is provided with a central longitudinal aperture 61 extending throughout its length and opening into the interior of tank 11. The diameter of sections 60 is less than the diameter of apertures 18. Tank 11 is further provided with a threaded inlet 62 similar to inlet 46 and adapted to be coupled to suitable supply means.

The general arrangement of this machine is quite simple. It is normally located above a conveyor (not shown) which automatically positions rows of container cups or other forms beneath the apertures 18. When solenoid 24 is released, spring 31 aligns apertures 18 and 23. The semi-frozen liquid in tank 13 then flows around the tubes 58 at the same time that syrup under pressure flows through the tubes 58. Both substances are then dispersed simultaneously into the containers to produce a sundae in each cup. The timer 40 is set to activate solenoid 24 after sufficient time has elapsed to fill the containers. This pulls cover 20 to block with tubes 58 and apertures 18 to prevent flow of both substances.

If only one substance is to be dispensed, the top tank 11 is removed and cover 12 is used to cap and seal the lower tank 10. The controls can then be set to dispense the one substance, such as semi-frozen ice cream, in the manner discussed above.

Many minor changes are possible in this invention. The controls and mechanical operation of cover 20 can be varied depending upon the choice of the fabricator, so long as this single element is used to instantly control the flow of both types of substances. The number of apertures 18 is, of course, a matter of choice, dependent upon the available container handling facilities. Therefore only the following claims are intended to define this invention.

Having thus described my invention, I claim:
1. A dispensing apparatus, comprising:
   a first tank having a plane bottom surface and an open upper end;
   a second tank having a bottom surface adapted to seal against the open upper end of said first tank;
   means connecting said first and second tanks to one another in said sealed positions;
   cover means mounted on said second tank in sealed relation thereto;
   said first tank being provided with a plurality of apertures formed through said plane bottom surface;
   said second tank including a plurality of downwardly directed hollow tubular projections open at their top ends to the interior of said second tank and located so as to be concentrically positioned within said apertures, the bottom area of the lower end of each of said projections being less than the inside area of each of said apertures, said tubular projections terminating flush with the plane bottom surface of said first tank;
   a plate slidably mounted on said plane bottom surface of said first tank, said plate being provided with a plurality of apertures formed therethrough in a pattern identical to that of said first tank apertures, said plate being movable relative to said first tank between a first position wherein said first tank apertures are blocked by said plate and a second position wherein said apertures of said plate and first tank are concentrically aligned;
   and means operatively connecting said plate and said first tank adapted to move said plate between said first and second positions.
2. The invention as defined in claim 1 wherein said last named means comprises:
   a solenoid mounted on the exterior of said first tank and having a movable element connected to said plate;
   a biasing spring connecting said plate and said first tank in opposition to said solenoid;
   and a timer wired in a solenoid control circuit connecting said solenoid to a source of electrical energy, said timer being adapted to operate said solenoid at pre-set intervals of time.
3. A dispensing apparatus, comprising:
   a first tank having a plane bottom surface provided with a plurality of spaced apertures formed therethrough;
   a second tank mounted on said first tank and including a plurality of hollow tubular projections opening to the interior of said second tank and terminating through said apertures flush with said bottom surface, the lower end of each projection being of a smaller area than that of each aperture;
   a plate slidably mounted on the bottom surface of said first tank and being provided with apertures spaced to correspond to the apertures of said first tank;
   solenoid means mounted on said first tank operatively connected to said plate adapted to reciprocate said plate relative to said first tank;
   biasing means mounted on said first tank operatively connected to said plate in opposition to said solenoid means;
   and an electrical circuit connecting said solenoid means to a source of electrical energy adapted to effect reciprocation of said plate relative to said first tank at pre-set intervals.

References Cited in the file of this patent
UNITED STATES PATENTS

| | | |
|---|---|---|
| 633,634 | Wright | Sept. 26, 1899 |
| 662,760 | Bogart | Nov. 27, 1900 |
| 2,559,032 | Tacchella | July 3, 1951 |
| 2,749,005 | Plusquellic | June 5, 1956 |
| 2,850,990 | Rasmusson | Sept. 9, 1958 |